(12) United States Patent
Namihira

(10) Patent No.: US 7,447,221 B2
(45) Date of Patent: Nov. 4, 2008

(54) COMMUNICATION APPARATUS

(75) Inventor: Daisuke Namihira, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 616 days.

(21) Appl. No.: 11/105,442

(22) Filed: Apr. 14, 2005

(65) Prior Publication Data

US 2006/0146826 A1    Jul. 6, 2006

(30) Foreign Application Priority Data

Dec. 8, 2004    (JP) .............................. 2004-355374

(51) Int. Cl.
 *H04L 12/56* (2006.01)
(52) U.S. Cl. .................... 370/401; 370/466; 370/392
(58) Field of Classification Search ........................ None
See application file for complete search history.

(56) References Cited

U.S. PATENT DOCUMENTS

| | | | |
|---|---|---|---|
| 2003/0172184 A1 | 9/2003 | Kong | |
| 2004/0179536 A1* | 9/2004 | Thubert et al. | 370/395.52 |
| 2004/0240468 A1* | 12/2004 | Chin et al. | 370/466 |
| 2005/0286553 A1* | 12/2005 | Wetterwald et al. | 370/466 |
| 2006/0083262 A1* | 4/2006 | Bhatia et al. | 370/466 |

FOREIGN PATENT DOCUMENTS

| | | |
|---|---|---|
| JP | 2003-510904 | 3/2003 |
| JP | 2003-273935 | 9/2003 |
| JP | 2004-515165 | 5/2004 |
| WO | WO 01-22683 | 3/2001 |
| WO | WO 02-45375 | 6/2002 |

OTHER PUBLICATIONS

B. Carpenter et al., RFC3056, Feb. 2001.

* cited by examiner

*Primary Examiner*—Duc C Ho
(74) *Attorney, Agent, or Firm*—Hanify & King, P.C.

(57) ABSTRACT

A communication apparatus to be used between first and second communication groups, each including one or more communication terminals, that perform communications by different types of communication protocols capable of embedding address information, comprises a first storage unit storing a destination address, and tunnel identification information for the first communication group when a packet transmitted from the second communication group is registered; a destination retrieval unit which determines whether a destination address extracted from the received packet is registered in the first storage unit; a second storage unit, storing information indicating whether the route designated by the tunnel identification information is constructible by a private address or by a global address; an encapsulation processing unit which extracts the address information for the first communication group from the destination address; and a control unit controlling whether the encapsulation is to be in accordance with the information of the second storage unit.

34 Claims, 10 Drawing Sheets

IPv4 ADDRESS OF DESTINATION:10.11.12.13(PRIVATE ADDRESS)

6to4 ADDRESS OF DESTINATION:2002:10.11.12.13:yyy...

FIG. 3

| IP DA | IP SA | DISCARD FLAG |
|---|---|---|
| a | b | 0 |
| c | d | 1 |
| e | don't care | 1 |
| ⋮ | ⋮ | ⋮ |

FIG. 4

| IP DA | DESTINATION INFORMATION | IPv4 ENCAPSULATION FLAG | IPv6 ENCAPSULATION FLAG | TUNNEL NUMBER |
|---|---|---|---|---|
| e | xxx | 1 | 0 | 10 |
| f | yyy | 0 | 1 | 20 |
| ------ | ------ | ------ | ------ | ------ |

FIG. 5

| TUNNEL NUMBER | 6to4 FLAG | PRIVATE ADDRESS CHECK FLAG | GLOBAL ADDRESS CHECK FLAG | HEADER INFORMATION |
|---|---|---|---|---|
| 10 | 1 | 1 | 0 | ppp |
| 20 | 0 | 0 | 0 | qqq |
| ------ | ------ | ------ | ------ | ------ |

COMMUNICATION APPARATUS

BACKGROUND OF THE INVENTION

The present invention relates to a communication apparatus enabling an Intranet connection in a network where different communication protocols mixedly exist.

At present, shifting from IPv4 (Internet Protocol version 4) to IPv6 which has a vast address space in order to solve a problem that global addresses of IPv4 will dry up has attracted attention. However, most of communications have been heretofore made using IPv4, and accordingly, it is substantially impossible to change all the communications instantaneously to communication with IPv6.

Further, among apparatuses which have already operated and have been installed with IPv4, some apparatuses require cost for expansion for the purpose of enabling such IPv6 communication, and cannot substantially perform a change to enable the communication by IPv6.

Therefore, in order to shift IPv4 to IPv6, a method has been adopted, which gradually replaces the current apparatuses with an apparatus and a relay apparatus, which are capable of the IPv6 communication. As a result, IPv4 and IPv6 mixedly exist on an IP network.

There are various shifting technologies enabling the IPv6 communication on the conventional IPv4 network in the case of such shifting to IPv6. One of those technologies is a tunnel technology, in which an IPv6 packet is encapsulated by an IPv4 header, communication is made by using the IPv4 header in an IPv4 network, and on a network or a terminal, which is capable of the IPv6 communication, the IPv4 header used for the encapsulation is detached to return (decapsulate) the encapsulated packet to the IPv6 packet.

Further, there are also various methods in this tunnel technology. As one of the methods, there is an automatic tunnel method utilizing 6to4 tunneling protocol. In a 6to4 tunnel, into an IPv6 address of an IPv6 header in an IPv6 packet sent out from a terminal installed with IPv6, which is a transmission source (hereinafter, referred to as "IPv6 terminal"), an IPv4 global address used when the IPv6 packet is encapsulated by IPv4 is embedded.

When the IPv6 packet passes through the IPv4 network, a terminal and a relay apparatus, which are located on an interface between IPv4 and IPv6, take out the IPv4 global address from the IPv6 address. Then, based on the taken-out IPv4 global address, the IPv4 header is automatically created, and communications with the IPv6 packet are thus made possible in the IPv4 network. Specifically, the 6to4 tunnel is one of automatic tunnel technologies.

In order to use this 6to4 tunnel, the IPv6 communication is performed by using an IPv6 address of a format in which higher-order 16 bits of the IPv6 address are a fixed value which is 2002 in the hexadecimal numbering system and the IPv4 global address is embedded into 32 bits following this fixed value.

The IPv4 header for encapsulation can be automatically created from the IPv4 global address embedded in such a way. However, in the 6to4 tunnel, there is a regulation that this embedded IPv4 address must be a global address (described in Chapter 2 of RFC3056 (Non-Patent document 1) which defines the 6to4 tunnel).

As defined in RFC 1918, IPv4 private addresses are addresses having prefixes like 10/8, 172.16/12 and 192.168/16, and in any organization, these addresses can be freely used. Therefore, a case normally occurs, where terminals having the same private address exist in plural different organizations.

Meanwhile, in an IPv4 public network such as the Internet, a private address cannot be used, and a global address must be used. This is because, when an arbitrary private address is used on the Internet, an address of a terminal overlaps the others, and the terminal cannot be identified. In general, the tunnel of the 6to4 format is constructed on the IPv4 public network, and accordingly, the private address has not been usable for the IPv4 address also in the case of using the tunnel of the 6to4 format.

Further, as known technologies for performing the encapsulation between the different communication protocols and tunneling by using the private address between private networks, the following are cited.

Patent document 1 discloses a technology for encapsulating, by a 6to4 tunneling encapsulator, a communication between IPv6 domains separated by IPv4 domains.

Patent document 2 discloses a technology, in which nodes which support incompatible network layer protocols, such as IPv4 and IPv6, determine a protocol set and perform automatic encapsulation therefor.

Patent document 3 discloses a technology for directly interconnecting the private networks through the tunneling by using private IP addresses.

[Patent document 1] JP 2003-510904 A
[Patent document 2] JP 2004-515165 A
[Patent document 3] JP 2003-273935 A
[Non-Patent document 1] B. Carpenter and another, "RFC3056", [online], February 2001, [retrieved on Dec. 8, 2004], Internet <URL: http://rfc.net/rfc3056.html>

In the conventional techniques, there is a possibility that a packet using a private address is transmitted to the public network in the tunnel technology such as a 6to4 tunnel technology, and accordingly, the private address has not been usable.

SUMMARY OF THE INVENTION

The present invention has been made in order to solve such a problem. It is an object of the present invention to provide a communication apparatus enabling the use of the private address in the network where the different communication protocols mixedly exist.

(1) In order to achieve the object, the present invention provides a communication apparatus to be used between a first communication group including one or two or more communication terminals that perform communications by a first type of communication protocol and a second communication group including one or two or more communication terminals that perform communications by a second type of communication protocol capable of embedding address information for use in the first communication group, characterized by including: a first storage unit, in which a destination address to the first communication group or the second communication group, and tunnel identification information for identifying attribute information of a route specified by address information for use in the first communication group when a packet transmitted from the second communication group via the first communication group to another second communication group is encapsulated by the address information for use in the first group and passed through the first communication group, are registered; a destination retrieval unit which makes retrieval as to whether or not a destination address extracted from the received packet is registered in the first storage unit; a second storage unit, in which communication enable/disable information indicating whether or not the route on the first communication group, the route being designated by using the tunnel identification information, is constructible by a private address or whether or not the route is constructible by a global address, is registered; an encapsulation processing unit which extracts the address information for use in the first communication group from the destination address to encapsulate the packet; and a control unit which makes control as to whether or not the encapsulation is to be performed in accordance with the communication enable/disable information of the second storage unit.

According to the present invention, in the communication apparatus to be used between the first communication group including one or two or more communication terminals which perform communications by the first type of communication protocol and the second communication group including one or two or more communication terminals which perform communications by the second type of communication protocol capable of embedding address information for use in the first communication group, in the case of transmitting the packet via the first communication group, whether or not the encapsulation including extracting the address information for use in the first communication group from the destination address is to be performed can be determined under control in accordance with the communication enable/disable information in the second storage unit.

(2) Further, the apparatus according to the present invention is characterized by further including: a decapsulation information storage unit in which information for identifying a packet as an object of decapsulation which restores the encapsulated packet to an original form thereof is registered; and a decapsulation processing unit which decapsulates the received packet in accordance with the information in the decapsulation information storage unit.

According to the communication apparatus of the present invention, the received packet is decapsulated in accordance with the information in the decapsulation information storage unit, and accordingly, the packet as the object of the decapsulation can be determined efficiently.

(3) Further, the apparatus according to the present invention is characterized by further including: a discarded information storage unit in which information indicating whether or not the received packet is a packet to be discarded is registered; and a packet discard-unit which discards the received packet in accordance with the information in the discarded information storage unit.

According to the communication apparatus of the present invention, the received packet is discarded in accordance with the information in the discarded information storage unit, and accordingly, a desired packet can be discarded.

(4) Further, the apparatus according to the present invention is characterized in that the first storage unit further includes encapsulation information indicating whether or not the encapsulation is to be performed by IPv4 or IPv6, and the encapsulation processing unit encapsulates the packet by IPv4 or IPv6 in accordance with the encapsulation information.

According to the communication apparatus of the present invention, desired encapsulation processing can be executed for the received packet with reference to the encapsulation information indicating whether or not the encapsulation is to be performed by IPv4 or IPv6 for a predetermined destination address.

(5) Further, the apparatus according to the present invention is characterized in that the second storage unit further includes packet conversion information indicating whether or not a packet of a 6to4 format is to be encapsulated, and the encapsulation processing unit encapsulates the packet of the 6to4 format in accordance with the packet conversion information.

According to the communication apparatus of the present invention, the received packet is converted into the packet of the 6to4 format in accordance with the packet conversion information indicating whether or not the packet of the 6to4 format is to be encapsulated. Accordingly, 6to4 encapsulation processing can be executed for a packet to be transmitted to a predetermined destination address.

(6) Further, the apparatus according to the present invention is characterized in that the encapsulation processing unit executes the discard of the packet or the encapsulation processing for the packet in accordance with the communication enable/disable information.

According to the communication apparatus of the present invention, the discard of the packet or the encapsulation processing for the packet is executed in accordance with the communication enable/disable information. Accordingly, the discard of the packet or the encapsulation processing for the packet can be executed on a tunnel basis.

(7) Further, the apparatus according to the present invention is characterized in that the encapsulation processing unit is capable of referring to plural pieces of tunnel identification information registered in a second table, and the encapsulation processing unit refers to, for each tunnel, information indicating whether or not to execute each of a first method permitting only a communication in which the destination address is the global address and a second method permitting only a communication in which the destination address is the private address.

According to the communication apparatus of the present invention, the information indicating whether or not to execute each of the first method permitting only the communication in which the destination address is the global address and the second method permitting only the communication in which the destination address is the private address is referred to on a tunnel basis. Accordingly, desired packet processing can be executed for each type of the destination address.

(8) Further, the apparatus according to the present invention is characterized in that, when a tunnel packet in which the destination address is the global address is received with respect to a tunnel interface in which only the second method is selected, the encapsulation processing unit discards the tunnel packet without performing the communication.

According to the communication apparatus of the present invention, only the tunnel packet in which the destination address is the global address is discarded. Accordingly, the packet with the global address can be prevented from being transmitted to a network in which the private address is used.

(9) Further, the apparatus according to the present invention is characterized in that, when a packet having an IPv6 address in which an IPv4 global address for use in a first network is embedded as the destination address is encapsulated into an IPv4 packet and transmitted to the tunnel interface in which only the second method is selected, the encapsulation processing unit discards the packet having the IPv6 packet without setting the packet as an object to be transmitted.

According to the communication apparatus of the present invention, when the packet having the IPv6 address in which the IPv4 global address is embedded is converted into the tunnel packet of the 6to4 format and transmitted, the tunnel packet is discarded without being set as the object to be transmitted. Accordingly, the packet with the global address can be prevented from being transmitted to the network in which only the private address is used.

(10) Further, the apparatus of the present invention is characterized in that, when the packet in which the destination address is encapsulated by the IPv4 global address is received with respect to a tunnel interface in which only the first method is selected, or when the packet in which the destination address is the IPv6 address having the IPv4 global address embedded thereinto is encapsulated into the IPv4 packet and transmitted to the tunnel interface, the encapsulation processing unit transmits/receives the encapsulated packet without discarding the encapsulated packet.

According to the communication apparatus of the present invention, when the tunnel packet of the 6to4 format, in which the destination address is the IPv4 global address, is received, or when the packet, in which the destination address is the IPv6 address having the IPv4 global address embedded thereinto is converted into the tunnel packet of the 6to4 format and transmitted, the tunnel packet is transmitted/received without being discarded. Accordingly, the packet with the global address can be transmitted/received even in a network where the private address and the global address mixedly exist.

(11) Further, the apparatus according to the present invention is characterized in that, when a setting of executing the first method or the second method is made, the encapsulation processing unit refers to information indicating whether or not to enable the setting when the packet is transmitted or when the packet is received.

According to the communication apparatus of the present invention, when the setting of executing the first method or the second method is made, the information indicating whether or not to enable the setting when the packet is transmitted or when the packet is received is referred to. Accordingly, the transmission/receipt of the packet can be controlled on a tunnel basis.

DESCRIPTION OF THE DRAWINGS

FIG. 3 is a view showing a configuration example of a decapsulation table.

FIG. 4 is a view showing a configuration example of a destination table.

FIG. 5 is a view showing a configuration example of an encapsulation table.

DETAILED DESCRIPTION OF THE INVENTION

An in-house communication system according to an embodiment of the present invention will be described below with reference to the drawings. A configuration of the embodiment is described for illustration, and the present invention is not limited to the configuration of the embodiment. Note that the present invention can be implemented by using hardware and software. In the case of implementing the present invention by the software composed of a program, various functions can be realized by installing the program constituting the software in the hardware such as a computer. Further, the program is installed in the computer and the like through a communication line or by using a computer-readable storage medium.

Here, the computer-readable recording medium means a recording medium capable of accumulating data and information regarding the program by means of an electric, magnetic, optical, mechanical or chemical function and reading the information from the computer. As ones detachable from the computer among such recording media, for example, there are a flexible disk, a magneto-optical disc, a CD-ROM, a CD-R/W, a DVD, a DAT, an 8-mm tape, a memory card, and the like. Further, as recording media fixed to the computer, there are a hard disk, a ROM (read only memory), and the like.

[Configuration of In-House Communication System]

Figure 1:
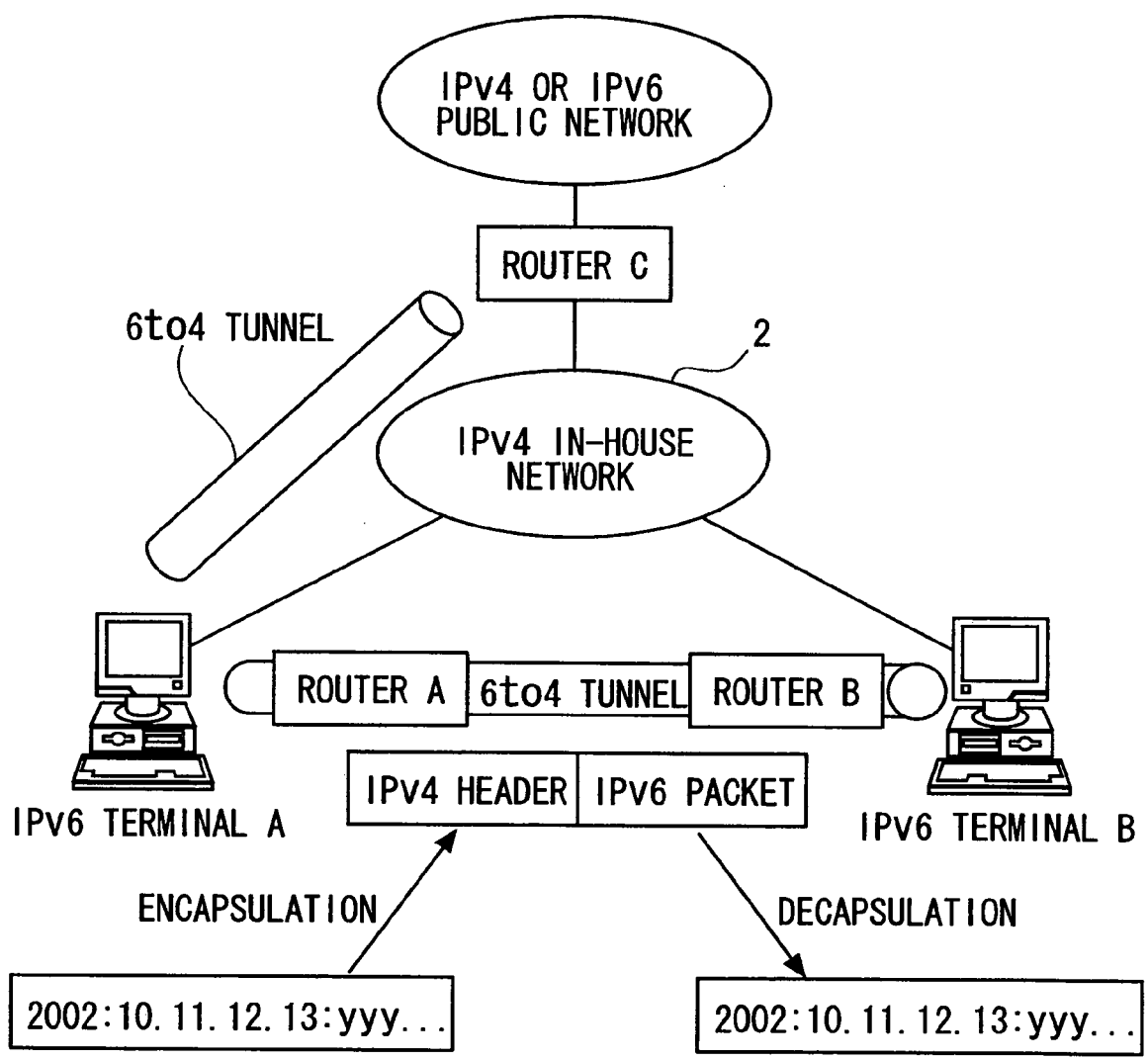
FIG. 1 is a view showing a configuration of a network in which a tunnel is provided in an in-house communication.

FIG. 1 is a view showing a configuration example of a network in which a tunnel is constructed in an in-house communication. An in-house communication system is composed of an IPv4 in-house network 2, terminals (hereinafter, referred to as "IPv6 terminals") which are connected to the IPv4 in-house network 2 and installed with IPv6 creating IPv6 packets, and routers A to C as relay apparatuses.

Although each of the IPv6 terminals A and B is illustrated as one terminal, each of the IPv6 terminals A and B may be a communication group including two or more communication terminals in the present invention. In a similar way, the IPv4 in-house network 2 may be a communication group including one or two or more communication terminals. Further, in this embodiment, it is assumed that the communication group includes terminals (hereinafter, referred to as "IPv4 terminals") installed with IPv4 creating IPv4 packets. Specifically, when the communication group is composed of plural terminals, the communication group includes the IPv4 terminal besides the IPv6 terminal in some cases.

Further, the router A and the router B are illustrated independently of the IPv6 terminals, the IPv6 terminals may be composed such that a function of each router (relay apparatus), which will be described from now on, serves as a part of a function in the IPv6 terminal.

Considering the use of a 6to4 tunnel in the in-house network, IPv4 private addresses can be assigned in a single organization without overlapping each other. As an example, the case where an embedded destination IPv4 address is a private address (10. 11. 12. 13) as shown in FIG. 1 will be described.

Into a packet which is created (generated) from the IPv6 terminal A and has a destination 6to4 address (2002: 10. 11. 12. 13:yyyy . . . ), the destination IPv4 private address is embedded.

The router A which has received the IPv6 packet from the IPv6 terminal A extracts the destination IPv4 private address from the IPv6 packet, encapsulates the IPv6 packet by an IPv4 header (IPv4), and transmits an IPv4 capsule to the router B through the IPv4 in-house network 2. Then, the router B detaches the IPv4 header of the received packet (IPv4 capsule) (decapsulation), and transmits the IPv6 packet to the IPv6 terminal B.

In contrast to this, when the IPv6 terminal A transmits a packet to the router C, the IPv6 terminal A creates an IPv4 capsule encapsulated by a private address. The router C decapsulates the received IPv4 capsule. Further, when it is determined that a destination address of the IPv4 capsule received by the router C is a global address and that a transmission source address is a private address, the IPv4 address is discarded without being transmitted to a public network. In such a way, it becomes possible to use the private address for the IPv4 address also in the case of using the tunnel of the 6to4 format. Specific configurations and operations will be described later.

[Internal Configuration Example of Relay Apparatus 4]

Figure 2:
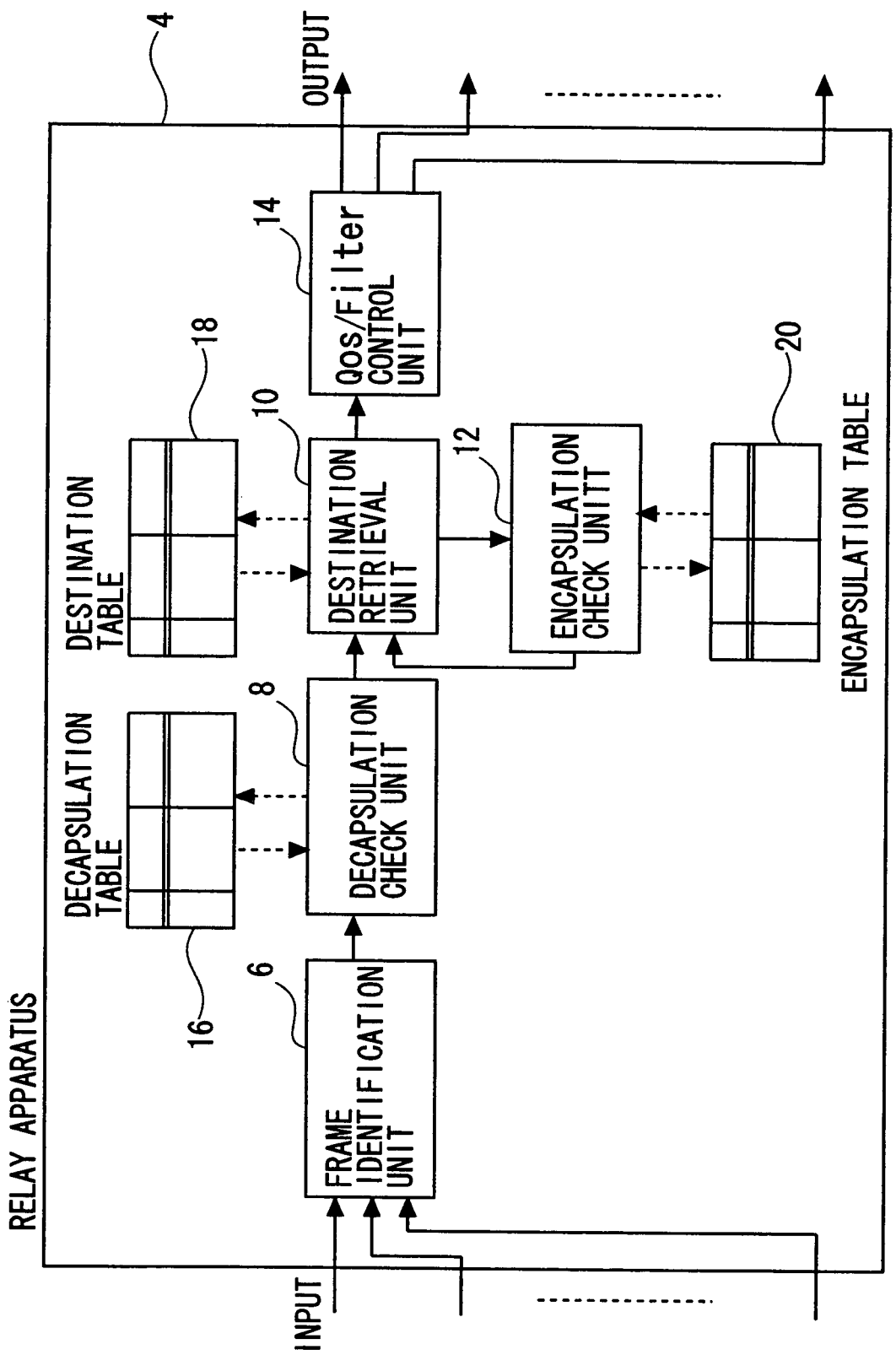
FIG. 2 is a block diagram explaining a relay apparatus of the present invention.

FIG. 2 is a diagram showing an example of an internal configuration of a relay apparatus 4. The relay apparatus 4 is shown as an example of an internal configuration of each of the routers A to C of FIG. 1 shows an internal configuration for encapsulating and decapsulating the packets. Further, it is possible to realize the configuration of the relay apparatus 4 by each of a communication terminal, a server, and an apparatus on a network where the tunnel of the 6to4 format can be provided.

The relay apparatus 4 is composed of (1) a frame identification unit 6 which identifies a received packet of IP or the like, (2) a decapsulation check unit 8 which determines whether the packet is an object to be decapsulated, (3) a destination retrieval unit 10 which determines an output destination of the packet based on a destination address, (4) an encapsulation check unit 12 which encapsulates the packet determined as the object to be encapsulated by the destination retrieval unit 10, and (5) a QoS/Filter control unit 14 which performs QoS control and filtering processing for the packet.

A decapsulation table 16, a destination table 18 and an encapsulation table 20 are used in the decapsulation check unit 8, the destination retrieval unit 10 and the encapsulation check unit 12, respectively. A setting of each table is executed by a computer connected to the relay apparatus 4, an operation unit (not shown) provided in the relay apparatus 4, and the like. The relay apparatus 4 processes the packet in accordance with a setting value of each table thus set.

Further, the decapsulation check unit 8 determines whether or not to decapsulate the received packet such as (i) a packet transmitted through the 6to4 tunnel and (ii) a packet transmitted from an IPv4 terminal belonging to the IPv4 in-house network 2 without passing through the 6to4 tunnel. For example, the decapsulation check unit 8 is a processing unit which functions in the router B which receives the packet from the IPv6 terminal A in FIG. 1.

The encapsulation check unit 12 determines whether or not to encapsulate the received packet such as (i) a packet to be transmitted to the 6to4 tunnel, (ii) the packet received from the 6to4 tunnel and (iii) a packet transmitted from an IPv4 terminal or an IPv6 terminal, which belongs to the IPv4 in-house network 2, without passing through the 6to4 tunnel. For example, the encapsulation check unit 12 is a processing unit which functions in the router A or the router C, which receives the packet from the IPv6 terminal A in FIG. 1.

The respective constituent elements of (1) the frame identification unit 6, (2) the decapsulation check unit 8, (3) the destination retrieval unit 10, (4) the encapsulation check unit 12, and (5) the QoS/Filter control unit 14 will be described below.

(1) The frame identification unit 6 identifies input packet (received packet), and performs extraction of information such as an address and checking of a header error and the like. This is a function of the conventional relay apparatus. (2) Next, the decapsulation check unit 8 is a block which determines whether or not the received packet is the object to be decapsulated. When it is determined by the frame identification unit 6 that the received packet is encapsulated, the decapsulation check unit 8 extracts an IP address from an external IP header of the encapsulated packet (packet in which the external IP header and an internal IP header exist). Then, the decapsulation check unit 8 searches the decapsulation table by using the extracted IP address as a search key.

Figure 3:
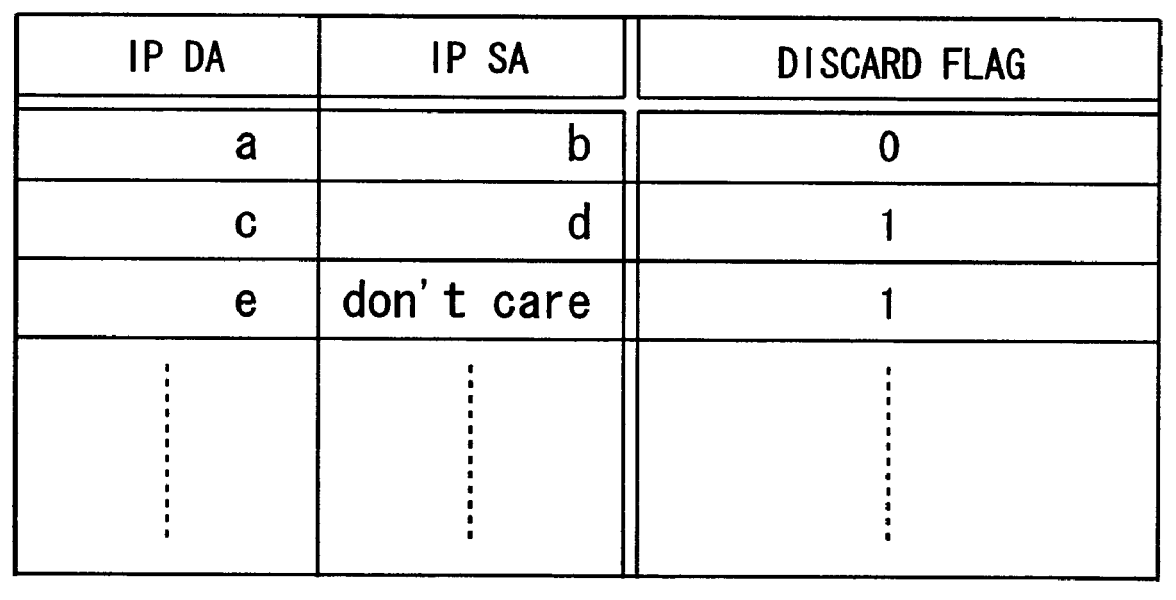

The IP address extracted by the decapsulation check unit 8 is an IP address (IP DA) and a transmission source IP address (IP SA), which are shown in FIG. 3. In this embodiment, the extracted IP address is an IPv4 address included in the external IP header of the received packet. Further, IP addresses shown in FIG. 3 and FIG. 4 are network addresses or host addresses.

The decapsulation table 16 (corresponding to "discarded information storage unit" of the present invention) is a table which stores information for determining whether or not the packet is the object to be decapsulated. FIG. 3 shows an example of details of contents of the decapsulation table 16. In FIG. 3, a discard flag is acquired by using an external header IP address (transmission source address/destination address) as a search key. If the discard flag is "1", the packet concerned is discarded. If the discard flag is "0", the packet is subjected to the next processing without being discarded. Further, only any of the transmission source addresses and the destination addresses may be set in the decapsulation table 16.

When the received packet is an object to be decapsulated (packet having the IP address hit by the search of the decapsulation table) as a result of searching the decapsulation table 16, the packet is decapsulated. Note that, if the discard flag is "1" in this case, the packet is discarded and not subjected to the subsequent processing. The decapsulation processing is processing for detaching the external IP header. Note that the decapsulation check unit 8 has a function to refer to the decapsulation table 16.

A private address is registered as the destination IP address (IP DA) of the decapsulation table, and the discard flag is set to "0", thus also enabling decapsulation processing for a tunnel constructed by the private address.

Figure 6:
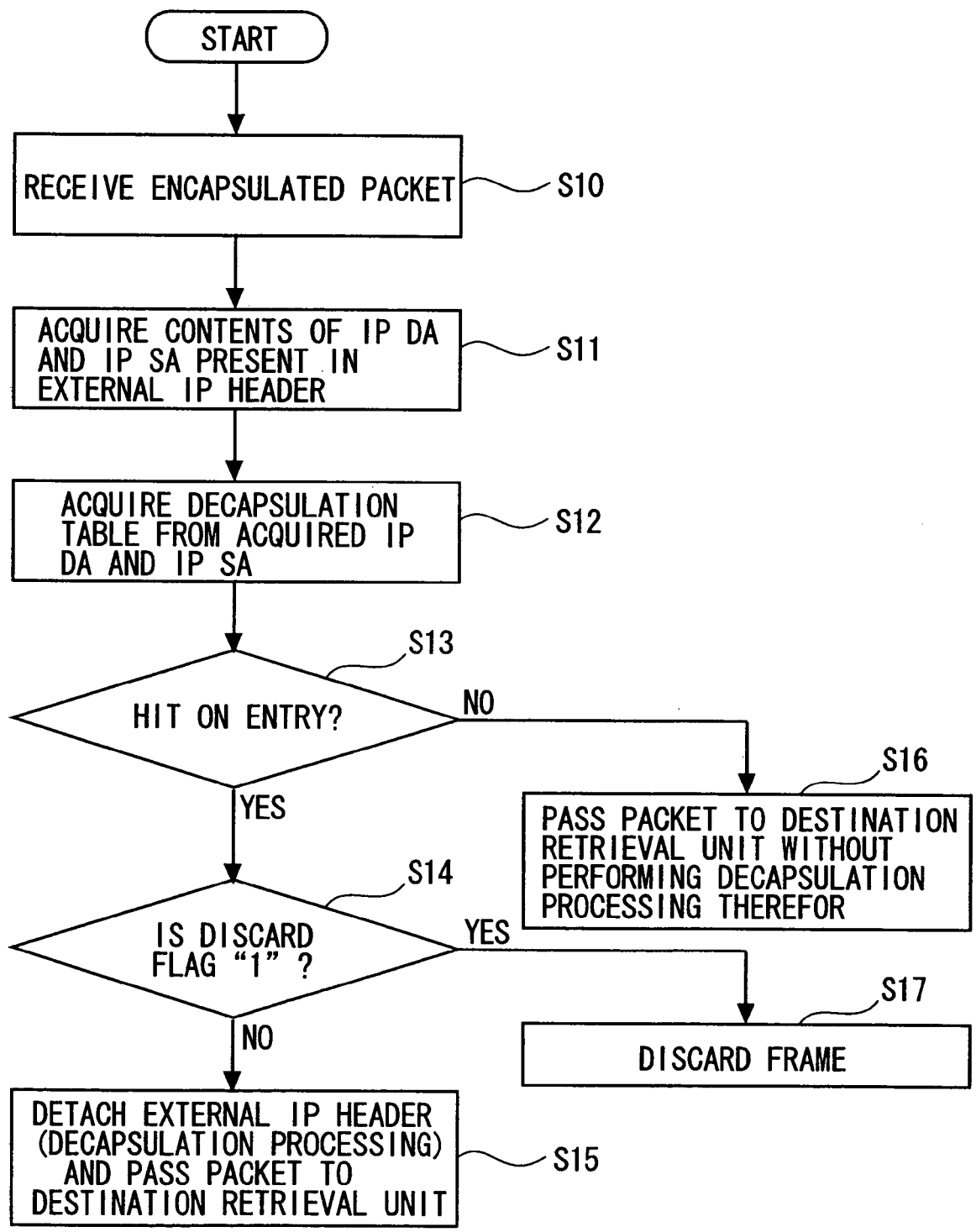
FIG. 6 is a flowchart showing operations of a decapsulation check unit.

Further, unless the private address is registered in the decapsulation table, the private address does not become an object of the decapsulation. Specifically, as shown in FIG. 6, a packet that is not an object of the decapsulation is passed to the destination retrieval unit 10 without being discarded. For example, a packet transmitted from an IPv4 terminal through the IPv4 in-house network 2 to another IPv4 terminal is not registered in the decapsulation table 16. Various settings are possible in a combination of the transmission source address which is a private address or a global address and the destination address which is a private address or a global address.

Further, the private address and the global address are registered in the decapsulation table, and the discard flags thereof are set to "1", thus also making it possible to set the received packet as an object to be discarded. For example, the discard flag is set as a filter for an attack packet.

Further, "don't care" is set as a data mask for the transmission source address of FIG. 3, thus also making it possible to discard all the packets to a transmission destination address "e" without specifying the transmission source address.

(3) Next, the destination retrieval unit 10 (corresponding to "destination retrieval unit" of the present invention) determines the output destination (tunnel number, transmission destination terminal, and the like) based on the destination IP address. Further, the destination retrieval unit 10 performs the same processing as routing processing and bridge relay processing, which a general relay apparatus usually performs.

First, the destination retrieval unit 10 refers to and searches the destination table by using the destination address of the external IP header of the packet as a search key. However, when the received packet is the packet which has become the object of the decapsulation in the decapsulation check unit 8, the destination address of the external IP header of the packet is a destination address of the internal IP header of the packet when receiving the packet.

The destination table 18 (corresponding to "first storage unit" of the present invention) is a table for acquiring information regarding to which transmission destination (tunnel) the packet is to be transmitted by using the destination address as the search key. FIG. 4 shows an example of details of contents of the destination table 18.

The destination retrieval unit 10 acquires destination information, an IPv4 encapsulation flag, an IPv6 encapsulation flag, a tunnel number and the like from the destination table by using the destination address of the packet as the key. The destination information is such information as to indicate which transmission destination the packet is to be outputted to, and is similar to destination information owned by a usual relay apparatus.

The IPv4 encapsulation flag is a flag indicating whether or not the received packet is to be encapsulated by the IPv4 header. If the IPv4 encapsulation flag is "1", it is indicated that the received packet is an object of processing for which the IPv4 capsule is to be created. If the IPv4 encapsulation flag is "0", it is indicated that the received packet is not the object of the processing for which the IPv4 capsule is to be created.

Further, the IPv6 encapsulation flag is a flag indicating whether or not the received packet is to be encapsulated by the IPv6 header. If the IPv6 encapsulation flag is "1", it is indicated that the received packet is an object of processing for which the IPv6 capsule is to be created. If the IPv6 encapsulation flag is "0", it is indicated that the received packet is not the object of the processing for which the IPv6 capsule is to be created.

Finally, the tunnel number is a number virtually assigned to each tunnel, and is used in the case of acquiring information (information of the encapsulation table) regarding what type of tunnel is to be provided for each destination address.

Further, if the destination address is a destination address hit by the search of the destination table, and both of the IPv4 encapsulation flag and the IPv6 encapsulation flag are 0, then usual relay processing is performed for the received packet based on the destination information, and the packet is passed to the QoS/Filter control unit 14.

If any of the IPv4 encapsulation flag and the IPv6 encapsulation flag is 1, then the packet is regarded as the object to be encapsulated, and after the tunnel number is acquired, the processing is shifted to the encapsulation check unit 12.

(4) The encapsulation check unit 12 (corresponding to "encapsulation processing unit" of the present invention) performs the encapsulation for the received packet. Note that the encapsulation processing unit may be defined to include not only the encapsulation check unit 12 but also the destination retrieval unit 10 and the QoS/Filter control unit as processing units for the encapsulation processing for the packet through the output thereof.

The encapsulation check unit 12 refers to and searches the encapsulation table (corresponding to "second storage unit" of the present invention) based on the tunnel number obtained by the destination retrieval unit 10. If the IPv4 encapsulation flag referred to and acquired by the destination retrieval unit 10 is "1", the encapsulation check unit 12 searches an encapsulation table for IPv4. Meanwhile, if the IPv6 encapsulation flag is "1", the encapsulation check unit 12 searches an encapsulation table for IPv6. Specifically, the relay apparatus has the plural encapsulation tables during a shifting period to IPv6. The encapsulation check unit 12 determines the encapsulation table to be referred to and searched in accordance with the set encapsulation flag.

Further, in the 6to4 format, the packet is encapsulated with the IPv4 header. An example of contents of the encapsulation table for IPv4 is shown in FIG. 5. The encapsulation check unit 12 acquires a 6to4 flag, a private address check flag, a global address check flag, and header information by using a tunnel number in FIG. 5 as a search key. Here, the header information is information indicating contents (TTL, IP DA/SA and the like) of the header for the encapsulation.

The 6to4 flag is a flag indicating whether or not this capsule is of the 6to4 format. If this field is "1", the encapsulation check unit 12 determines that a setting of the private address check flag and a setting of the global address check flag are effective.

Further, if the field of the 6to4 flag is "1", the IPv4 address for use in the encapsulation is acquired from the IPv6 address of the received packet, and the encapsulation check unit 12 ignores contents of destination address/transmission source address (addresses on both ends of the capsule) predefined in the header information of the encapsulation table 20.

If the field of the 6to4 flag is "0", the encapsulation check unit 12 determines that the tunnel is not of the 6to4 format. Specifically, the destination address/transmission source address (addresses on both ends of the capsule) become effective. The encapsulation check unit 12 encapsulates the received packet in order to provide the tunnel by a setting value of the header information.

When the tunnel of the 6to4 format is set (when the field of the 6to4 flag is "1"), the encapsulation check unit 12 acquires setting values of the private address check flag and the global address check flag.

The private address check flag is a flag indicating whether or not check is to be made as to whether or not the IPv4 address extracted from the IPv6 address of the 6to4 format in the packet to be transmitted is a private address. The global address check flag is a flag indicating whether or not check is to be made as to whether or not the IPv4 address extracted from the IPv6 address of the 6to4 format in the packet to be transmitted is a global address. If the check flag is "1", a type (private, global) of the address is checked.

When the address in question matches the private address or the global address as a result of checking the type of the address, the encapsulation check unit 12 discards the packet. For example, when the private address check flag is "1", and the extracted IPv4 address is the private address, the encapsulation check unit 12 discards the received packet.

In such a way, when the relay apparatus 4 outputs the packet to the tunnel, the encapsulation check-unit processes the packet with reference to settings of permission/inhibition of the transmission in each of the private address and the global address. Further, when the relay apparatus 4 outputs the packet to a public network or other in-house networks, the encapsulation check unit processes the packet with reference to settings of permission/inhibition of the transmission in each of the private address and the global address.

Hence, for each tunnel, it is possible to perform such settings and references as (i) to permit only the transmission of the global address, (ii) to permit only the transmission of the private address, and (iii) to permit the transmissions of the global address and the private address.

After the encapsulation check unit 12 performs the encapsulation processing for the packet, the destination retrieval unit 10 performs the destination retrieval by using the encapsulated external IP header again, and passes the packet to the QoS/Filter control unit 14.

(5) The QoS/Filter control unit 14 is a processing unit which performs the QoS control and the filtering processing for the packet. Further, the QoS/Filter control unit 14 may be the same as those provided in the conventional relay apparatus.

Figure 7:
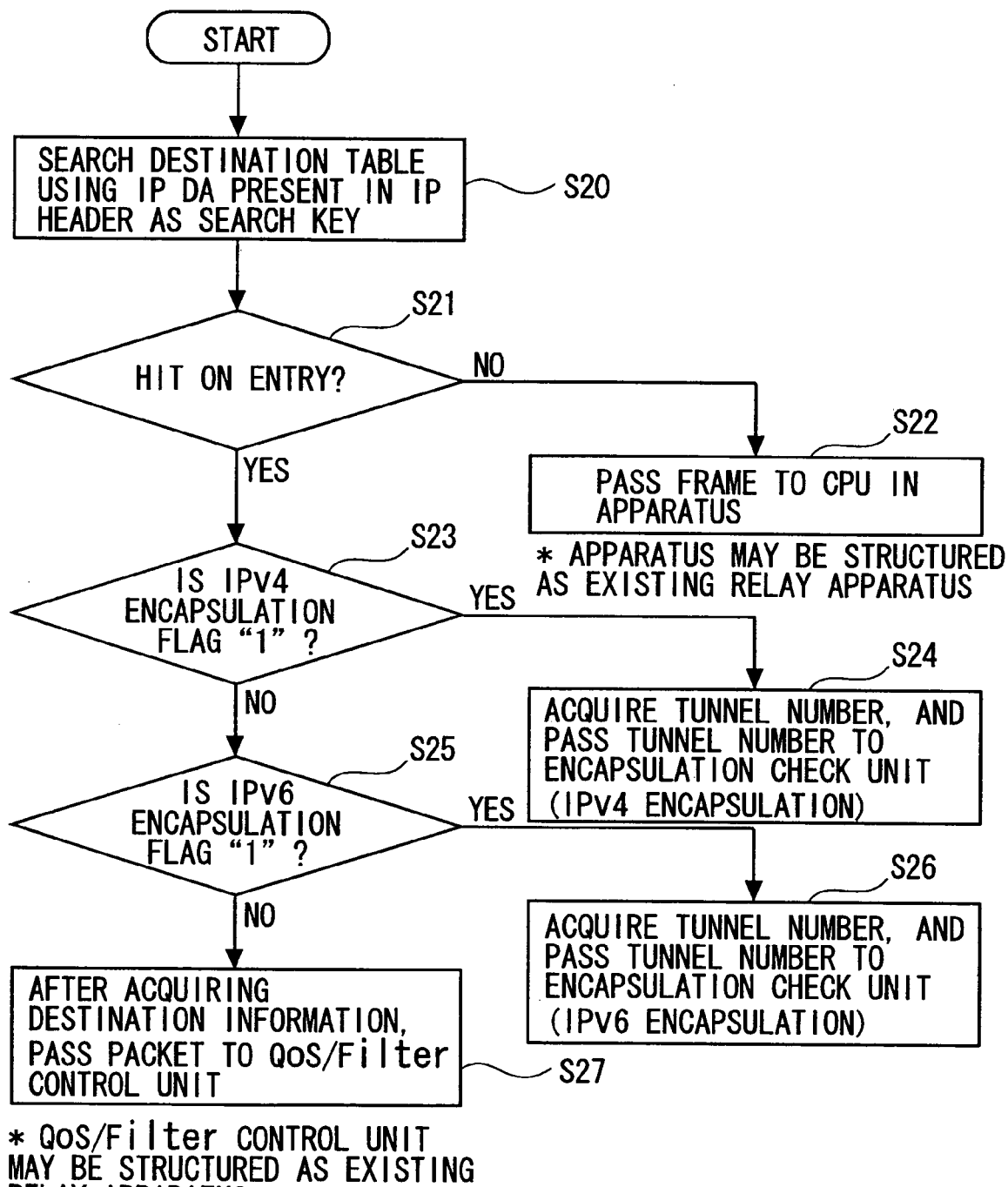
FIG. 7 is a flowchart showing operations of a destination retrieval unit.
Figure 8:
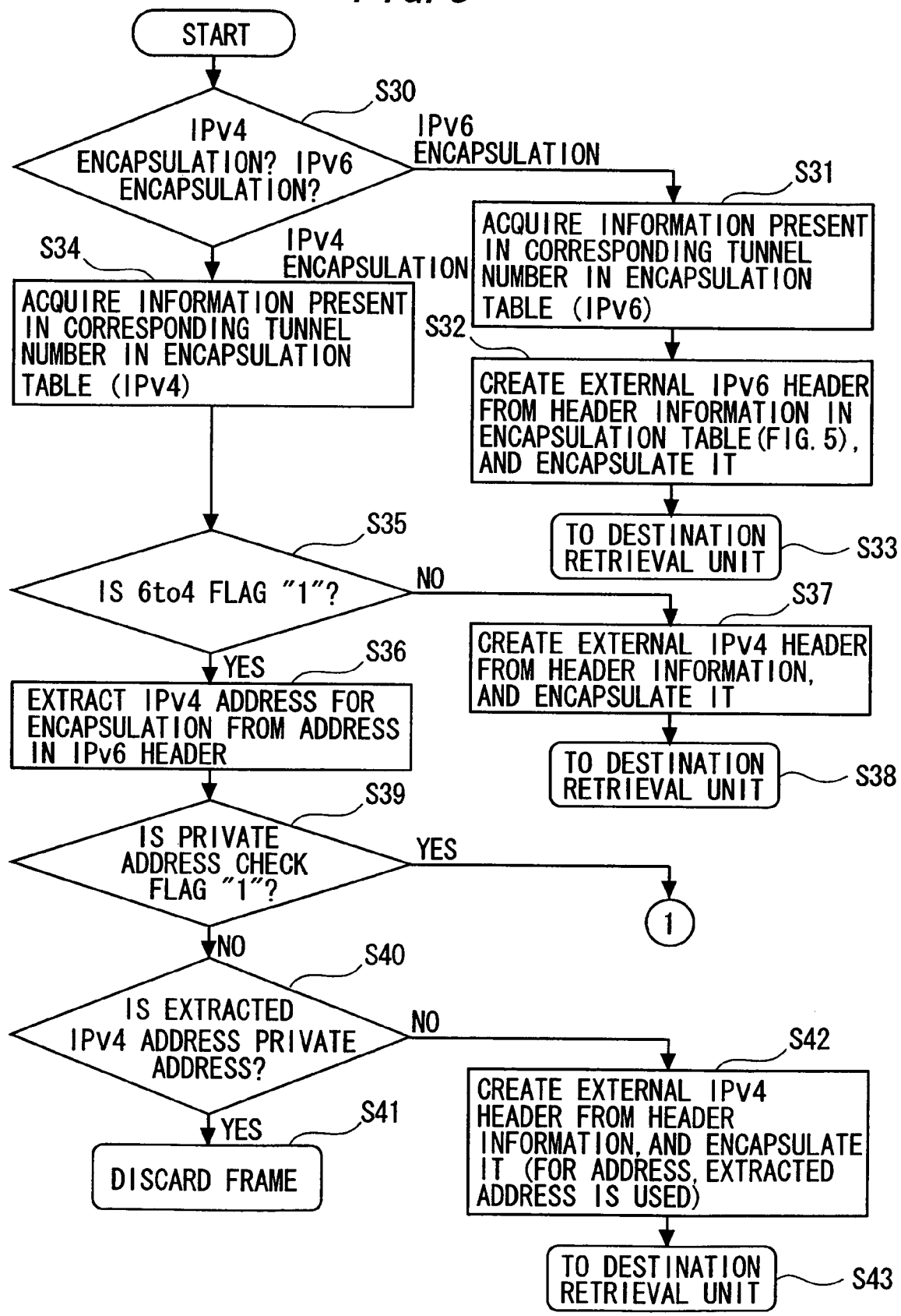
FIG. 8 is a flowchart showing operations of an encapsulation check unit.

Through the processing described above, functional settings regarding, for example whether to permit the use of the global address/private address or not in the tunnel of the 6to4 format can be made. Next, the respective flows in the decapsulation check unit 8, the destination retrieval unit 10 and the encapsulation check unit 12 will be described with reference to FIG. 6 to FIG. 8. FIG. 6 to FIG. 8 are views showing examples where the received packet is the IPv4 packet or the IPv6 packet. Note that each processing flow is presented for illustration, and each processing is not limited to this.

[1. Explanation of Flow of Decapsulation Check Unit 8]

FIG. 6 is a flowchart showing operations of the decapsulation check unit 8. The decapsulation check unit 8 receives an encapsulated packet or a packet which is not encapsulated from the frame identification unit (S10).

The decapsulation check unit 8 extracts the destination address and transmission source address of the external IP header of the received packet, and refers to/searches the decapsulation table 16 by using the extracted addresses as a search key (S11, S12). When the destination address and the transmission source address are registered in the decapsulation table 16, the decapsulation check unit 8 acquires a setting value of the discard flag correlated with these addresses (S13).

When the discard flag is "0", the decapsulation check unit 8 detaches the external IP header, and passes the decapsulated packet to the destination retrieval unit 10 (S14, S15). Specifically, the packet in which the discard flag is "0" is an encapsulated packet.

Meanwhile, when the destination address or the transmission source address is not registered in the decapsulation table 16, the decapsulation check unit 8 passes the packet to the destination retrieval unit 10 without decapsulating the packet (S16). The decapsulation check unit 8 discards the packet in which the discard flag is "1" (S17)

[2. Explanation of Flow of Destination Retrieval Unit 10]

FIG. 7 is a flowchart showing operations of the destination retrieval unit 10. The destination retrieval unit 10 receives the packet decapsulated by the decapsulation check unit 8 or the packet which is not decapsulated thereby. Then, the destination retrieval unit 10 extracts the destination address of the external IP header, and refers to and searches the destination table 18 by using the extracted destination address as a search key (S20). Note that, when the destination retrieval unit 10 receives the packet encapsulated by the encapsulation check unit 20, usual transmission processing is performed.

When the destination address is registered in the destination table 18 ("Yes" in S21), the destination retrieval unit 10 acquires a value of the IPv4 encapsulation flag. Meanwhile, when the destination address is not registered in the destination table 18, the destination retrieval unit 10 passes the packet to a CPU (central processing unit) in the relay apparatus 4 (S22).

When the acquired value of the IPv4 encapsulation flag is "1", the destination retrieval unit 10 acquires a value of the tunnel number correlated with the destination address, and passes the acquired value to the encapsulation check unit 12 (S23, S24). When the acquired value of the IPv4 encapsulation flag is "0", the destination retrieval unit 10 acquires a value of the IPv6 encapsulation flag.

When the acquired value of the IPv6 encapsulation flag is "1", the destination retrieval unit 10 acquires the value of the tunnel number correlated with the destination address, and passes the acquired value to the encapsulation check unit 12 (S25, S26). When the acquired value of the IPv6 encapsulation flag is "0", the destination retrieval unit 10 acquires the destination information from the destination table 18, and passes the packet to the QoS/Filter control unit 14 (S27). The QoS/Filter control unit 14 functions similarly to the existing relay apparatus.

As described above, the destination retrieval unit 10 passes the packet as the object of the IPv4 encapsulation and the packet as the object of the IPv6 encapsulation to the encapsulation check unit 12.

[3. Explanation of Flow of Encapsulation Check Unit 12]

Figure 9:
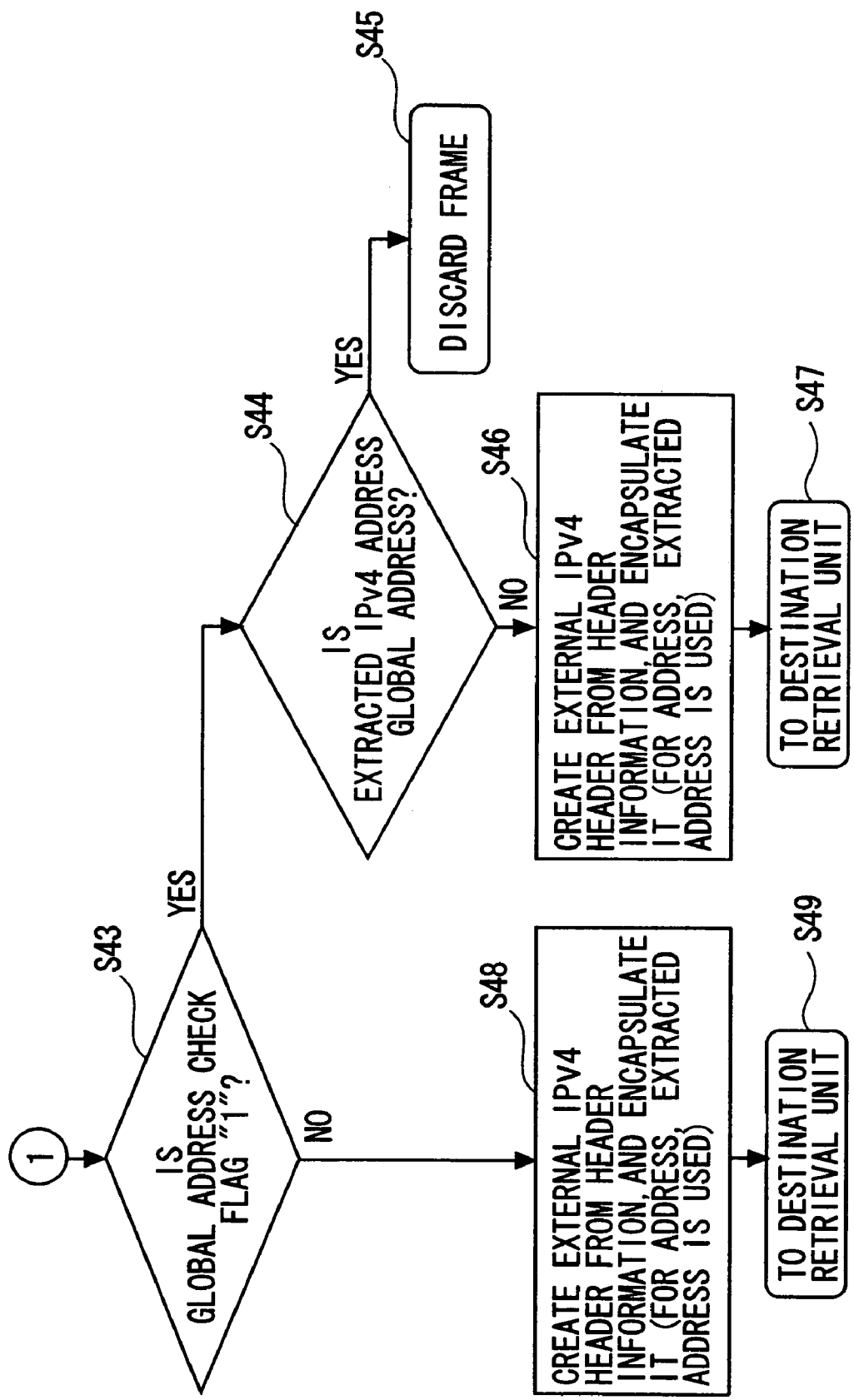
FIG. 9 is a flowchart showing operations of the encapsulation check unit.

FIG. 8 and FIG. 9 are flowcharts showing operations of the encapsulation check unit 12. The encapsulation check unit 12 determines whether the received packet is the packet as the object of the IPv4 encapsulation or the packet as the object of the IPv6 encapsulation (S30).

When the received packet is the packet as the object of the IPv6 encapsulation, the encapsulation check unit 12 refers to and searches the encapsulation table 20 by using the tunnel number as a search key, and acquires information corresponding to the tunnel number (S31). Next, the encapsulation check unit 12 creates the external IPv6 header by using the header information, thereby creating the IPv6 capsule (S32). The created IPv6 capsule is passed to the destination retrieval unit 10 (S33).

Specifically, when the destination address is "f" in accordance with the setting of "IPv6 encapsulation flag=1" shown in FIG. 4, and the tunnel number correlated with the destination address "f", which is shown in FIG. 5, is "20", the IPv6 capsule is created by using the header information of the encapsulation table (S31, S32).

When the received packet is the packet as the object of the IPv4 encapsulation, the encapsulation check unit 12 searches the encapsulation table 20 by using the tunnel number as a search key, and acquires the information corresponding to the tunnel number (S34).

When the 6to4 flag is "0", in order to create the IPv4 capsule by using the IPv4 address embedded into the destination address, the IPv4 address for the encapsulation is extracted from the address of the IPv6 header (S36). When the 6to4 flag is "0", the external IPv4 header is created by using the header information set in the encapsulation table, thereby creating the IPv4 capsule (S37). The created IPv4 capsule is passed to the destination retrieval unit 10 (S38).

When the 6to4 flag is "1", the "private address flag check" and the "global address flag check", which are shown in FIG. 5, become effective. When the private address flag check is "1", the encapsulation check unit 12 determines whether or not the extracted IPv4 address is the private address (S40). When the extracted IPv4 address is the private address, the encapsulation check unit 12 discards the packet (S41).

When the extracted IPv4 address is not the private address, the encapsulation check unit 12 creates the external IPv4 header from the header information of the received packet, thereby creating the IPv4 capsule (S42). The created IPv4 capsule is passed to the destination retrieval unit 10 (S43). Here, the created IPv4 capsule is transmitted to the IPv4 public network through the 6to4 tunnel using the destination global address. When the private address flag is not "1" in the determination of S39, the encapsulation check unit 12 shifts the control to the processing of FIG. 9.

Subsequently, the flowchart of the encapsulation check unit 12 will be described with reference to FIG. 9.

When the "global address flag check" shown in FIG. 5 is "0", the encapsulation check unit 12 creates the external IPv4 header from the header information of the received packet, thereby creating the IPv4 capsule (S48). Then, the created IPv4 capsule is passed to the destination retrieval unit 10 (S49).

When the global address flag check is "1", the encapsulation check unit 12 determines whether or not the extracted IPv4 address is the global address ("Yes" in S43, S44). When the extracted IPv4 address is the global address, the encapsulation check unit 12 discards the packet (S45).

When the extracted IPv4 address is not the global address, the encapsulation check unit 12 creates the external IPv4 header from the header information of the received packet, thereby creating the IPv4 capsule (S46). Then, the created IPv4 capsule is passed to the destination retrieval unit 10 (S47). For example, the created IPv4 capsule is transmitted to the IPv4 in-house network 2 through the 6to4 tunnel using the destination private address.

As described above, the encapsulation check unit 12 refers to the setting of the encapsulation table 20, and thus determines the type of the encapsulation (encapsulation of the 6to4 format, the encapsulation based on the header information of the encapsulation table), and executes the discarding or encapsulation of the packet in accordance with the type of the destination address (S35 to S49, corresponding to "control unit" of the present invention).

Figure 10:
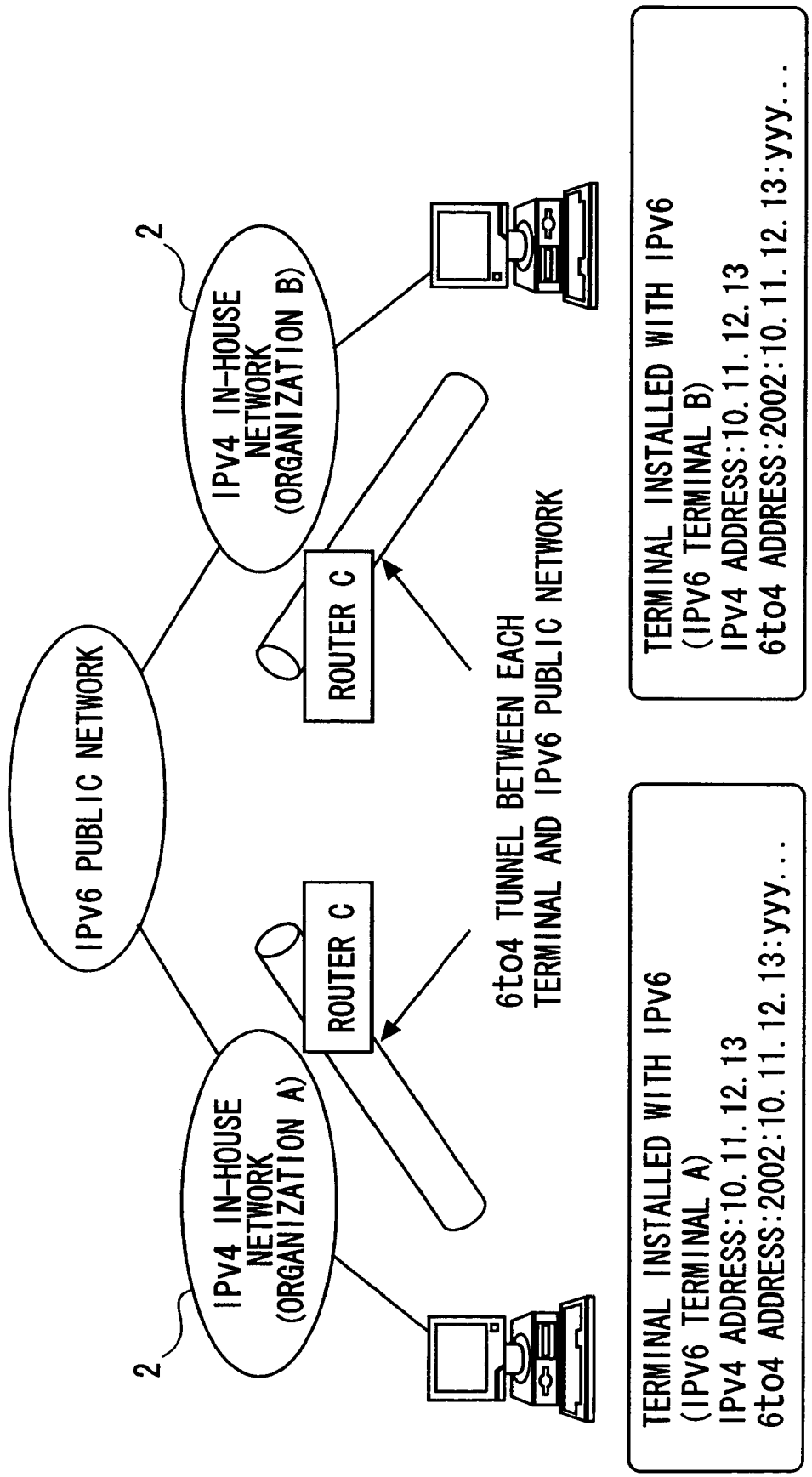
FIG. 10 is a view showing a configuration example of a network using IPv6 addresses having IPv4 private addresses embedded thereinto in a case of providing tunnels of a 6to4 format.

FIG. 10 is a view showing a configuration example of a network using the IPv6 address having the IPv4 private address embedded thereinto in the case of performing a communication by using the tunnel of the 6to4 format. In FIG. 10, an example is shown, where the same private address is set at the IPv6 terminal A connected to the IPv4 in-house network 2 of the organization A and at the IPv6 terminal B connected to the IPv4 in-house network 2 of an organization B. In an IPv6 public network, use of the private address is prohibited.

In the example shown in FIG. 10, if the IPv6 terminal A and the IPv6 terminal B make communications with each other, the communication is made by IPv6 in the IPv6 public network present therebetween. However, each of the organizations has an IPv4 network, and accordingly, a tunnel will be provided in the organization.

Here, in the case of providing the 6to4 tunnel, when the communication is made by embedding an IPv4 private address of its own terminal, a prefix of higher-order 48 bits of the IPv6 address becomes the same between the IPv6 terminal A and the IPv6 terminal B.

It becomes impossible for the relay apparatus present in the IPv6 public network to adequately perform a relay operation because, to the relay apparatus, the organization A and the organization B seem to have IPv6 networks with the same prefix.

In the present invention, in the case where the router C receives the packet having the IPv4 private address embedded thereinto, the router C discards the packet, thus making it possible to solve the problem described above. Further, by adopting such a configuration, it is possible to permit the communication at the time of providing the tunnel of the 6to4 format without checking the type of the address even if the embedded IPv4 address is a private address.

In such a way, it becomes possible to freely provide the 6to4 tunnel even in the network managed by using the IPv4 private addresses as in the organization, and it becomes possible to avoid the problem.

Further, it is made possible for each tunnel to make selection as to whether or not the embedded IPv4 address is compliant with the conventional regulation to permit only the global address. Thus, a problem of transmission of a protocol-violating packet such as outputting the IPv4 private address to an area of a communication to the outside (communication via the IPv4 public network) can also be solved.

Further, the various settings described above are enabled for each tunnel, and accordingly, it is also made possible to cope with both of the internal and external communications of the IPv4 private network by selecting the conventional method/expansion method.

By introducing the terminal and the relay apparatus 4, which are implemented with this method, into the in-house IPv4 private network, the automatic tunnel of the 6to4 format using the private address becomes usable also for the internal communication, and management cost in the case of performing manual settings not to transmit the packet using the private address to the public network becomes unnecessary.

The communication apparatus of the present invention can use the private address in a network where different communication protocols mixedly exist.

What is claimed is:

1. A communication apparatus to be used between a first communication group including one or two or more communication terminals that perform communications by a first type of communication protocol and a second communication group including one or two or more communication terminals that perform communications by a second type of communication protocol capable of embedding address information for use in the first communication group, comprising:
    a first storage unit, in which a destination address to the first communication group or the second communication group, and tunnel identification information for identifying attribute information of a route specified by address information for use in the first communication group when a packet transmitted from the second communication group via the first communication group to another second communication group is encapsulated by the address information for use in the first group and passed through the first communication group, are registered;
    a destination retrieval unit which makes retrieval as to whether or not a destination address extracted from the received packet is registered in the first storage unit;
    a second storage unit, in which communication enable/disable information indicating whether or not the route on the first communication group, the route being designated by using the tunnel identification information, is constructible by a private address or whether or not the route is constructible by a global address, is registered;
    an encapsulation processing unit which extracts the address information for use in the first communication group from the destination address to encapsulate the packet; and a control unit which makes control as to whether or not the encapsulation is to be performed in accordance with the communication enable/disable information of the second storage unit.

2. The communication apparatus according to claim 1, further comprising: a decapsulation information storage unit in which information for identifying a packet as an object of decapsulation which restores the encapsulated packet to an original form thereof is registered; and
    a decapsulation processing unit which decapsulates the received packet in accordance with the information in the decapsulation information storage unit.

3. The communication apparatus according to claim 1, further comprising:
    a discarded information storage unit in which information indicating whether or not the received packet is a packet to be discarded is registered; and a packet discard unit which discards the received packet in accordance with the information in the discarded information storage unit.

4. The communication apparatus according to claim 1, wherein the first storage unit further includes encapsulation information indicating whether or not the encapsulation is to be performed by IPv4 or IPv6, and the encapsulation processing unit encapsulates the packet by IPv4 or IPv6 in accordance with the encapsulation information.

5. The communication apparatus according to claim 1, wherein the second storage unit further includes packet conversion information indicating whether or not a packet of a 6to4 format is to be encapsulated, and the encapsulation processing unit encapsulates the packet of the 6to4 format in accordance with the packet conversion information.

6. The communication apparatus according to claim 1, wherein the encapsulation processing unit executes the discard of the packet or the encapsulation processing for the packet in accordance with the communication enable/disable information.

7. The communication apparatus according to claim 1, wherein the encapsulation processing unit is capable of referring to plural pieces of tunnel identification information registered in the second storage unit, and the encapsulation processing unit refers to, for each tunnel, information indicating whether or not to execute each of a first method permitting a communication when the address information for use in the first communication group from the destination address is the global address and a second method permitting a communication when the address information for use in the first communication group from the destination address is the private address.

8. The communication apparatus according to claim 7, wherein, when a tunnel packet in which the address information for use in the first communication group from the destination address is the global address is received with respect to a tunnel interface in which only the second method is selected, the encapsulation processing unit discards the tunnel packet without performing the communication.

9. The communication apparatus according to claim 7, wherein, when a packet having an IPv6 address in which an IPv4 global address for use in a first network is embedded as the destination address is encapsulated into an IPv4 packet and transmitted to the tunnel interface in which only the second method is selected, the encapsulation processing unit discards the packet having the IPv6 packet without setting the packet as an object to be transmitted.

10. The communication apparatus according to claim 7, wherein, when the packet in which the destination address is encapsulated by the IPv4 global address is received with respect to a tunnel interface in which only the first method is selected, or when the packet in which the destination address is the IPv6 address having the IPv4 global address embedded thereinto is encapsulated into the IPv4 packet and transmitted to the tunnel interface, the encapsulation processing unit transmits/receives the encapsulated packet without discarding the encapsulated packet.

11. The communication apparatus according to claim 7, wherein, when a setting of executing the first method or the second method is made, the encapsulation processing unit refers to information indicating whether or not to enable the setting when the packet is transmitted or when the packet is received.

12. The communication apparatus according to claim 1, wherein the communication apparatus comprises any one of the communication terminal, a relay apparatus, a server, and an apparatus on a network capable of performing the encapsulation through a tunnel of a 6to4 format.

13. A communication method to be used between a first communication group including one or two or more communication terminals that perform communications by a first type of communication protocol and a second communication group including one or two or more communication terminals that perform communications by a second type of communication protocol capable of embedding address information for use in the first communication group, comprising:

a first storage step of storing for reference, a destination address to the first communication group or the second communication group, and tunnel identification information for identifying attribute information of a route specified by address information for use in the first communication group when a packet transmitted from the second communication group via the first communication group to another second communication group is encapsulated by the address information for use in the first group and passed through the first communication group;

a destination retrieval step of performing retrieval as to whether or not a destination address extracted from the received packet is registered in the first storage step;

a second storage step of storing for reference, in which communication enable/disable information indicating whether or not the route on the first communication group, the route being designated by using the tunnel identification information, is constructible by a private address or whether or not the route is constructible by a global address;

an encapsulation processing step of extracting the address information for use in the first communication group from the destination address to encapsulate the packet; and a control step of performing control as to whether or not the encapsulation is to be performed in accordance with the communication enable/disable information in the second storage step.

14. The communication method according to claim 13, further comprising:

a decapsulation information storage step of storing for reference, information for identifying a packet as an object of decapsulation which returns the encapsulated packet to an original form thereof; and a decapsulation processing step of decapsulating the received packet in accordance with the information in the decapsulation information storage step.

15. The communication method according to claim 13, further comprising:

a discarded information storage step of registering information indicating whether or not the received packet is a packet to be discarded; and a packet discard step of discarding the received packet in accordance with the information in the discarded information storage step.

16. The communication method according to claim 13, wherein the first storage step further stores encapsulation information indicating whether or not the encapsulation is to be performed by IPv4 or IPv6, and the encapsulation processing step includes encapsulating the packet by IPv4 or IPv6 in accordance with the encapsulation information.

17. The communication method according to claim 13, wherein the second storage step further stores packet conversion information indicating whether or not a packet of a 6to4 format is to be encapsulated, and the encapsulation processing step includes encapsulating the packet of the 6to4 format in accordance with the packet conversion information.

18. The communication method according to claim 13, wherein the encapsulation processing step includes executing the discard of the packet or the encapsulation processing for the packet in accordance with the communication enable/disable information.

19. The communication method according to claim 13, wherein the encapsulation processing step allows reference to plural pieces of tunnel identification information registered in the second storage unit, and the encapsulation processing step includes referring to, for each tunnel, information indicating whether or not to execute each of a first method permitting a communication when the address information for use in the first communication group from the destination address is the global address and a second method permitting a communication when the address information for use in the first communication group from the destination address is the private address.

20. The communication method according to claim 19, wherein when a tunnel packet in which the address information for use in the first communication group from the destination address is the global address is received with respect to a tunnel interface in which only the second method is selected, the encapsulation processing step includes discarding the tunnel packet without performing the communication.

21. The communication method according to claim 19, wherein when a packet having an IPv6 address in which an IPv4 global address for use in a first network is embedded as the destination address is encapsulated into an IPv4 packet and transmitted to the tunnel interface in which only the second method is selected, the encapsulation processing step includes discarding the packet having the IPv6 packet without setting the packet as an object to be transmitted.

22. The communication apparatus according to claim 19, wherein when the packet in which the destination address is encapsulated by the IPv4 global address is received with respect to a tunnel interface in which only the first method is selected, or when the packet in which the destination address is the IPv6 address having the IPv4 global address embedded thereinto is encapsulated into the IPv4 packet and transmitted to the tunnel interface, the encapsulation processing step includes transmitting/receiving the encapsulated packet without discarding the encapsulated packet.

23. The communication method according to claim 19 wherein when a setting of executing the first method or the second method is made, the encapsulation processing step includes referring to information indicating whether or not to enable the setting when the packet is transmitted or when the packet is received.

24. A computer readable recording medium storing a communication program to be used between a first communication group including one or two or more communication terminals that perform communications by a first type of communication protocol and a second communication group including one or two or more communication terminals that perform communications by a second type of communication protocol capable of embedding address information for use in the first communication group, the program causing a computer to execute:
a first storage step of storing for reference, a destination address to the first communication group or the second communication group, and tunnel identification information for identifying attribute information of a route specified by address information for use in the first communication group when a packet transmitted from the second communication group via the first communication group to another second communication group is encapsulated by the address information for use in the first group and passed through the first communication group;
a destination retrieval step of performing retrieval so as to whether or not a destination address extracted from the received packet is registered in the first storage step;
a second storage step of storing for reference, in which communication enable/disable information indicating whether or not the route on the first communication group, the route being designated by using the tunnel identification information, is constructible by a private address or whether or not the route is constructible by a global address;
an encapsulation processing step of extracting the address information for use in the first communication group from the destination address to encapsulate the packet; and a control step of performing control as to whether or not the encapsulation is to be performed in accordance with the communication enable/disable information in the second storage step.

25. The computer readable recording medium storing the communication program according to claim 24, wherein the program further causes the computer to execute:
a decapsulation information storage step of storing for reference, information for identifying a packet as an object of decapsulation which returns the encapsulated packet to an original form thereof; and
a decapsulation processing step of decapsulating the received packet in accordance with the information in the decapsulation information storage step.

26. The computer readable recording medium storing the communication program according to claim 24, wherein the program further causes the computer to execute:
a discarded information storage step of registering information indicating whether or not the received packet is a packet to be discarded; and
a packet discard step of discarding the received packet in accordance with the information in the discarded information storage step.

27. The computer readable recording medium storing the communication program according to claim 24, wherein the first storage step further stores encapsulation information indicating whether or not the encapsulation is to be performed by IPv4 or IPv6, and the encapsulation processing step includes encapsulating the packet by IPv4 or IPv6 in accordance with the encapsulation information.

28. The computer readable recording medium storing the communication program according to claim 24, wherein the second storage step further stores packet conversion information indicating whether or not a packet of a 6to4 format is to be encapsulated, and the encapsulation processing step includes encapsulating the packet of the 6to4 format in accordance with the packet conversion information.

29. The computer readable recording medium storing the communication program according to claim 24, wherein the encapsulation processing step includes executing the discard of the packet or the encapsulation processing for the packet in accordance with the communication enable/disable information.

30. The computer readable recording medium storing the communication program according to claim 24, wherein the encapsulation processing step allows reference to plural pieces of tunnel identification information registered in the second storage unit, and the encapsulation processing step includes referring to, for each tunnel, information indicating whether or not to execute each of a first method permitting a communication when the address information for use in the first communication group from the destination address is the global address and a second method permitting a communication when the address information for use in the first communication group from the destination address is the private address.

31. The computer readable recording medium storing the communication program according to claim 30, wherein when a tunnel packet in which the address information for use in the first communication group from the destination address is the global address is received with respect to a tunnel interface in which only the second method is selected, the encapsulation processing step includes discarding the tunnel packet without performing the communication.

32. The computer readable recording medium storing the communication program according to claim 30, wherein when a packet having an IPv6 address in which an IPv4 global address for use in a first network is embedded as the destination address is encapsulated into an IPv4 packet and transmitted to the tunnel interface in which only the second method is selected, the encapsulation processing step includes discarding the packet having the IPv6 packet without setting the packet as an object to be transmitted.

33. The computer readable recording medium storing the communication program according to claim 30, wherein when the packet in which the destination address is encapsulated by the IPv4 global address is received with respect to a tunnel interface in which only the first method is selected, or when the packet in which the destination address is the IPv6 address having the IPv4 global address embedded thereinto is encapsulated into the IPv4 packet and transmitted to the tunnel interface, the encapsulation processing step includes transmitting/receiving the encapsulated packet without discarding the encapsulated packet.

34. The computer readable recording medium storing the communication program according to claim 30, wherein when a setting of executing the first method or the second method is made, the encapsulation processing step includes referring to information indicating whether or not to enable the setting when the packet is transmitted or when the packet is received.

\* \* \* \* \*

UNITED STATES PATENT AND TRADEMARK OFFICE
CERTIFICATE OF CORRECTION

PATENT NO. : 7,447,221 B2
APPLICATION NO. : 11/105442
DATED : November 4, 2008
INVENTOR(S) : Daisuke Namihira It is certified that error appears in the above-identified patent and that said Letters Patent is hereby corrected as shown below:

Column 17, line 35, in claim 22, delete "apparatus" and insert --method-- therefor.

Signed and Sealed this

Third Day of March, 2009

JOHN DOLL
*Acting Director of the United States Patent and Trademark Office*